United States Patent
Menon et al.

(10) Patent No.: US 11,157,374 B2
(45) Date of Patent: Oct. 26, 2021

(54) TECHNOLOGIES FOR EFFICIENT RELIABLE COMPUTE OPERATIONS FOR MISSION CRITICAL APPLICATIONS

(71) Applicant: Intel Corporation, Santa Clara, CA (US)

(72) Inventors: Sankaran M. Menon, Austin, TX (US); Rolf Kuehnis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 16/234,671

(22) Filed: Dec. 28, 2018

(65) Prior Publication Data
US 2019/0138408 A1    May 9, 2019

(51) Int. Cl.
| | | |
|---|---|---|
| G06F 11/00 | (2006.01) | |
| G06F 11/18 | (2006.01) | |
| G06F 11/27 | (2006.01) | |
| G06N 20/00 | (2019.01) | |

(52) U.S. Cl.
CPC .......... G06F 11/184 (2013.01); G06F 11/27 (2013.01); *G06F 2201/82* (2013.01); *G06N 20/00* (2019.01)

(58) Field of Classification Search
CPC ........ G06F 11/184; G06F 11/27; G06N 20/00
See application file for complete search history.

(56) References Cited

U.S. PATENT DOCUMENTS

| | | | | |
|---|---|---|---|---|
| 9,886,343 B2* | 2/2018 | Casper | ...................... | G11C 5/02 |
| 10,205,733 B1* | 2/2019 | Park | .................... | H04L 63/1408 |
| 2006/0005081 A1 | 1/2006 | Seth et al. | | |
| 2006/0224552 A1* | 10/2006 | Riezler | ................. | G06F 16/337 |
| 2011/0264972 A1 | 10/2011 | Matsuo | | |
| 2014/0047271 A1 | 2/2014 | Gray et al. | | |
| 2017/0221279 A1* | 8/2017 | Yu | ......................... | G06F 21/577 |
| 2017/0293862 A1 | 10/2017 | Kamiya et al. | | |
| 2019/0138408 A1 | 5/2019 | Menon et al. | | |

FOREIGN PATENT DOCUMENTS

KR    1020120137841 A    12/2012

OTHER PUBLICATIONS

PCT International Search Report and Written Opinion issued in PCT/US2019/062594, dated Mar. 5, 2020; 9 pages.

* cited by examiner

*Primary Examiner* — Katherine Lin
(74) *Attorney, Agent, or Firm* — Alliance IP, LLC

(57) ABSTRACT

Technologies for efficiently providing reliable compute operations for mission critical applications include a reliability management system. The reliability management system includes circuitry configured to obtain conclusion data indicative of a conclusion made by each of two or fewer compute devices of a host system. The conclusion data from each compute device pertains to the same operation. Additionally, the circuitry is configured to identify whether an error has occurred in the operation of each compute device, determine, in response to a determination that an error has occurred, a severity of the error, and cause the host system to perform a responsive action as a function of the determined severity of the error.

17 Claims, 11 Drawing Sheets

TECHNOLOGIES FOR EFFICIENT RELIABLE COMPUTE OPERATIONS FOR MISSION CRITICAL APPLICATIONS

BACKGROUND

In systems that provide operations where completion of a mission and/or maintaining safety during a process are of paramount importance, such as in autonomous driving systems, drones, robotics, and industrial systems, redundant compute devices typically perform the same operations together (e.g., as backups to each other), to safeguard against faults or failures. The most common approach is the use of triple modular redundancy (TMR), in which three compute devices perform the same operation and their outputs are provided to a vote counter device that performs a majority vote process (e.g., determines which output occurred the most) to determine the final output of the system (e.g., an identification of an object on a roadway, a determination of how to respond to the identified object, etc.). Some systems that require significantly higher reliability employ more than three redundant compute devices, such as five, seven, or more. Further, such systems include multiple vote counter devices for further redundancy. While these systems do improve reliability, they come at a cost of increased power consumption, weight, delay, size, and cost compared to conventional less reliable systems.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
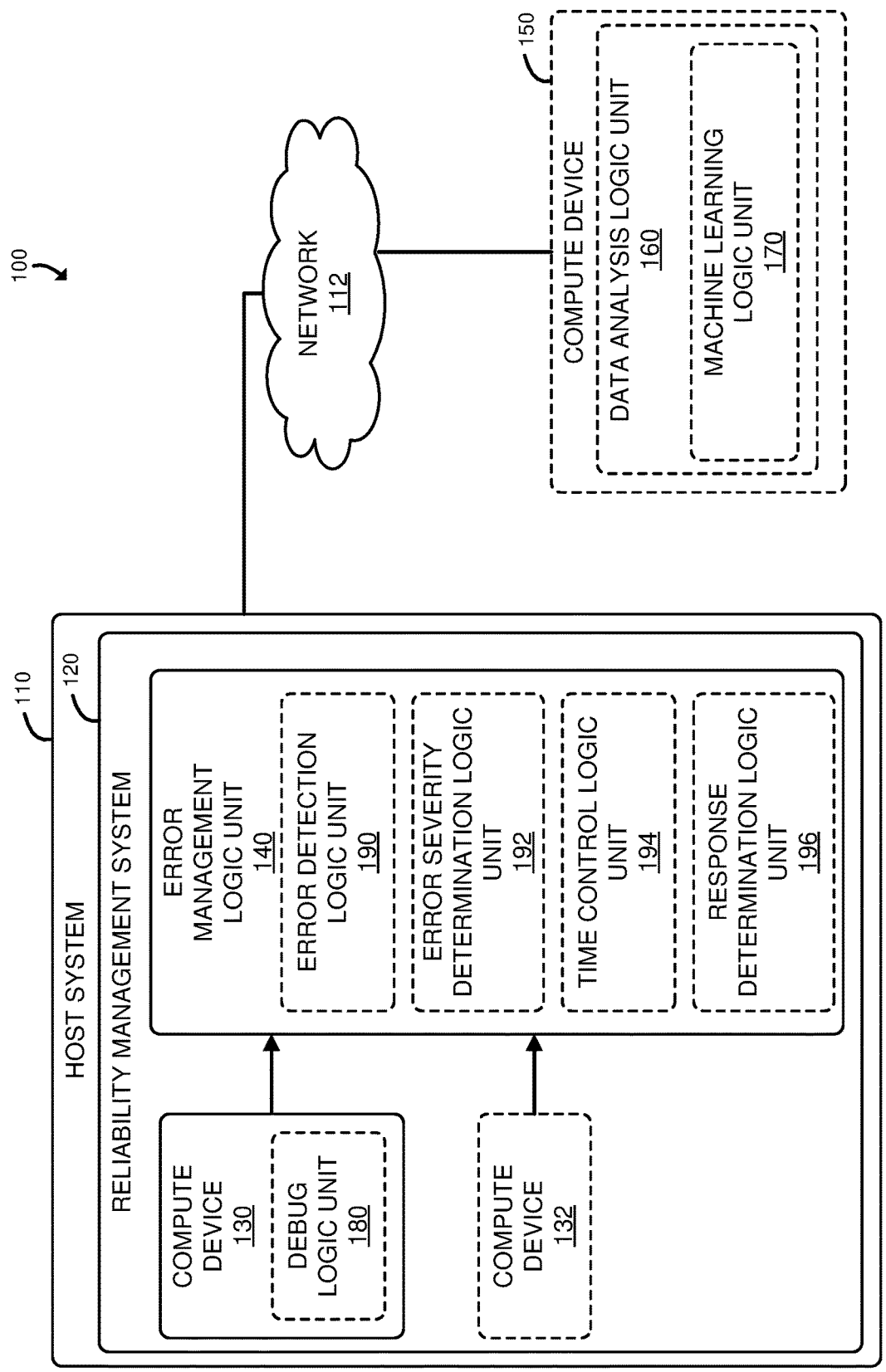
FIG. 1 is a simplified diagram of at least one embodiment of a system for efficiently providing reliable compute operations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for efficiently providing reliable compute operations includes a host system 110, which may be embodied as any device or assembly of devices (e.g., an autonomous vehicle, a drone, a robot, etc.) configured to perform one or more processes in which reliability is of relatively high importance (e.g., navigating to a destination without colliding into another object, performing a surgical procedure, etc.). In the illustrative embodiment, the host system 110 includes a reliability management system 120 and may be in communication with a remote compute device 150 through a network 112. The reliability management system 120 includes a compute device 130, and, in some embodiments, a second compute device 132, each of which is configured to perform mission-related operations (e.g., identification of object on a roadway, determining the status of one or more subsystems of the host system, and/or determining responsive actions to identifications of objects and/or changes in status). The compute device 130 may also include a debug logic unit 180 which may be embodied as any device or circuitry (e.g., an integrated circuit, a processor, etc.) configured to perform a test of compute logic and/or memory of the compute device 130 and identify any resulting errors. Additionally, the reliability management system 120 includes an error management logic unit 140 which may be embodied as any device or circuitry (e.g., an integrated circuit, an application specific integrated circuit (ASIC), a field programmable gate array (FPGA), a processor, a microcontroller, etc.) configured to receive outputs from the compute device(s) (e.g., the compute device 130 and the compute device 132) and determine, based on the received output(s), whether an error is present in the compute devices 130, 132, determine a severity of the error, if any, and determine a responsive action based on the presence and severity of the error. In doing so, the error management logic unit 140 may communicate with a remote compute device (e.g., the compute device 150, which may be located in a cloud data center) to perform one or more of the determinations. The error management logic unit 140, in the illustrative embodiment, includes an error detection logic unit 190, an error severity determination logic unit 192, a time control logic unit 194, and a response determination logic unit 196.

The error detection logic unit 190 may be embodied as any device or circuitry (e.g., a processor, an integrated circuit, etc.) configured to determine, from the data received from the set of compute devices 130, 132 whether an error has occurred in the operation of the compute devices 130, 132. In doing so, the error detection logic unit 190 may determine whether determinations made by each compute device 130, 132 pertaining to the same operation (e.g., identification of an object, determination of the status of a subsystem of the host system 110, such as a condition of a set of brakes, a temperature of an engine, etc.), a determination of a responsive action to be performed based on a determined condition, etc.) differ from each other, indicating an error, and/or whether results from one or more self-test operations (e.g., a logic built-in self test, a memory built-in self test, etc.) are indicative of an error. The error severity determination logic unit 192 may be embodied as any device or circuitry (e.g., a processor, an integrated circuit, etc.) configured to determine the severity (e.g., a glitch, a soft error, a hard error, etc.) of any detected errors. In doing so, the error severity determination logic unit 192 may apply weights (also referred to herein as "filter weights") to the determined differences or self test results to determine the corresponding severity of the error, as described in more detail herein. The time control logic unit 194 may be embodied as any device or circuitry (e.g., a processor, an integrated circuit, etc.) configured to add time information to data (e.g., determinations made by the compute device(s) 130, 132, self-test results, etc.) that is to be reported to a remote compute device for analysis (e.g., the compute device 150). Additionally, the response determination logic unit 196 may be embodied as any device or circuitry (e.g., a processor, an integrated circuit, etc.) configured to determine a responsive action, if any, to be taken after the presence and severity of an error have been determined.

As described in more detail herein, in some embodiments, an operation performed by the error logic management unit (e.g., detection of an error, determination of the severity of error, determination of a responses based on the severity of the error) may be offloaded to or performed in conjunction with the remote compute device 150. The remote compute device 150, in the illustrative embodiment, includes a data analysis logic unit 160, which may be embodied as any device or circuitry for analyzing data received from the reliability management system 120 and determining whether an error has occurred in the operation of the compute device(s) 130, 132, determining the severity of the error, and/or determining a responsive action to be taken by the reliability management system 120. In doing so, the data analysis logic unit 160 may perform machine learning operations with a machine learning logic unit 170, which may be embodied as any device or circuitry (e.g., a processor, an integrated circuit, a field programmable gate array (FPGA), etc.) configured to iteratively adjust an analysis of received data based on feedback from earlier determinations made by the machine learning logic unit 170 (e.g., using a neural network). Additionally or alternatively, the machine learning operations may be performed locally (e.g., in the reliability management system 120). As compared to typical mission-critical or safety-critical systems in which reliability is provided by utilizing three or more compute devices in a host system (e.g., an autonomous vehicle, a drone, a robot, etc.) to redundantly perform the same operations, the system 100 provides similar reliability with two or fewer compute devices, thereby providing greater efficiency over typical systems.

Figure 2:
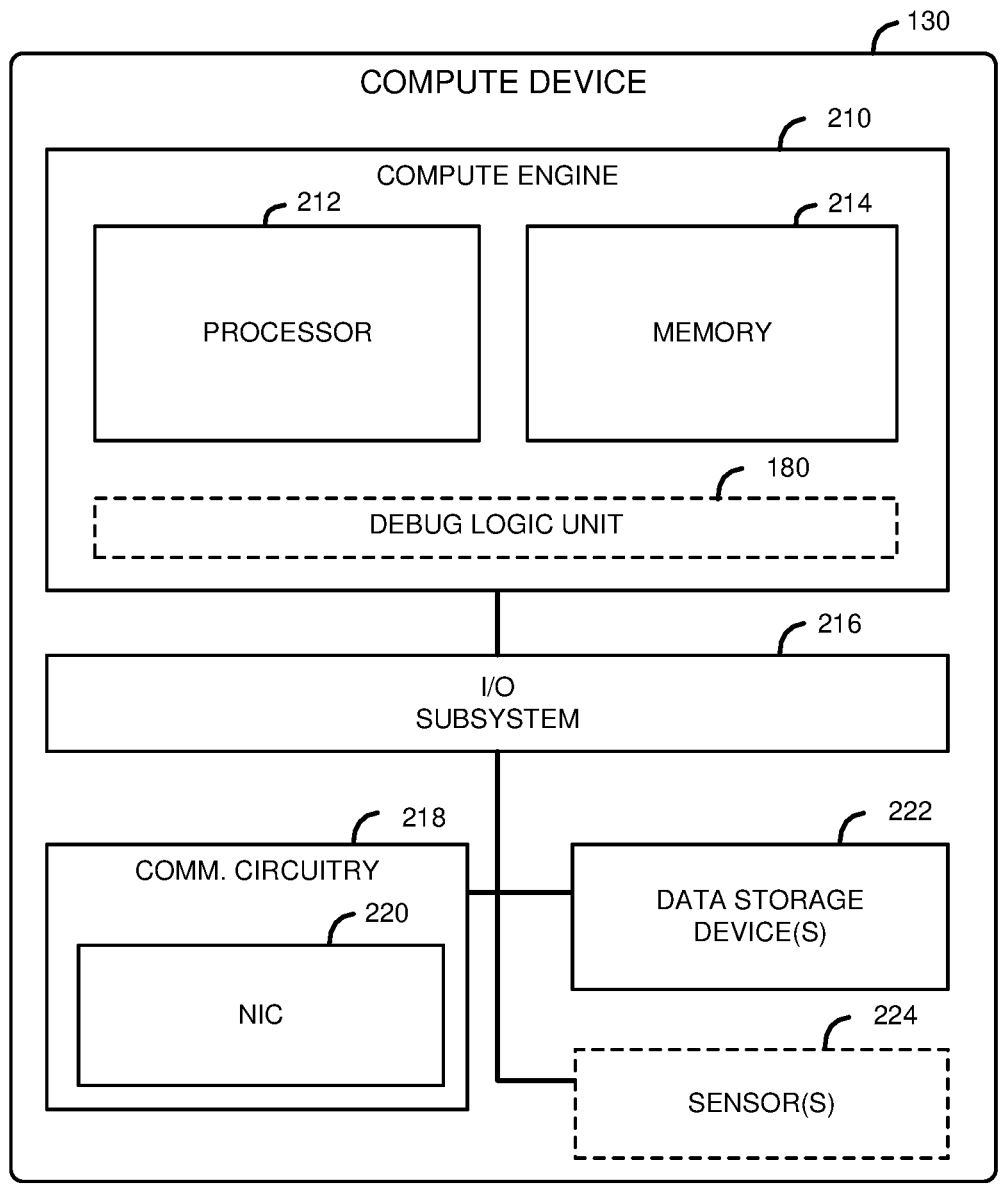
FIG. 2 is a simplified block diagram of at least one embodiment of a compute device included in the system of FIG. 1.

Referring now to FIG. 2, the illustrative compute device 130 includes a compute engine (also referred to herein as "compute engine circuitry") 210, an input/output (I/O) subsystem 216, communication circuitry 218, and one or more data storage devices 222. Of course, in other embodiments, the compute device 130 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The compute engine 210 may additionally include the debug logic unit 180 described with reference to FIG. 1. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. In some embodiments, the memory 214 may include DDR5, DDR6, LPDDR5, LPDDR6, or other types of memory. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, libraries, and drivers.

The compute engine 210 is communicatively coupled to other components of the compute device 130 via the I/O subsystem 216, which may be embodied as circuitry and/or components to facilitate input/output operations with the compute engine 210 (e.g., with the processor 212 and/or the main memory 214) and other components of the compute device 130. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 130, into the compute engine 210.

The communication circuitry 218 may be embodied as any communication circuit, device, or collection thereof, capable of enabling communications over the network 112 between the compute device 130 and another device (e.g., the error management logic unit 140, the compute device 150, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the compute device 130 to connect with another compute device (e.g., the error management logic unit 140, the compute device 150, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 130 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems. Additionally, the compute device 130 may include one or more sensors 224, each of which may be embodied as any device or circuitry (e.g., a camera, a radar sensor, a lidar sensor, a temperature sensor, etc.) configured to sense one or more conditions present in an environment of the compute device (e.g., in an environment in which the host system 110 is located) and provide data indicative of the sensed condition to the compute engine 210.

The compute devices 132, 150 and the error management logic unit 140 may have components similar to those described in FIG. 2 with reference to the compute device 130. The description of those components of the compute device 130 is equally applicable to the description of components of the compute devices 132, 150 and the error management logic unit 140 with the exception that, in some embodiments, the compute device 150 and/or the error management logic unit 140 does not include the sensors 224. Further, it should be appreciated that any of the compute devices 130, 132, 150 and the error management logic unit 140 may include other components, sub-components, and devices commonly found in a computing device, which are not discussed above in reference to the compute device 130 and not discussed herein for clarity of the description.

As described above, the compute devices 130, 132, 150 are illustratively in communication via the network 112, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

Figure 3:
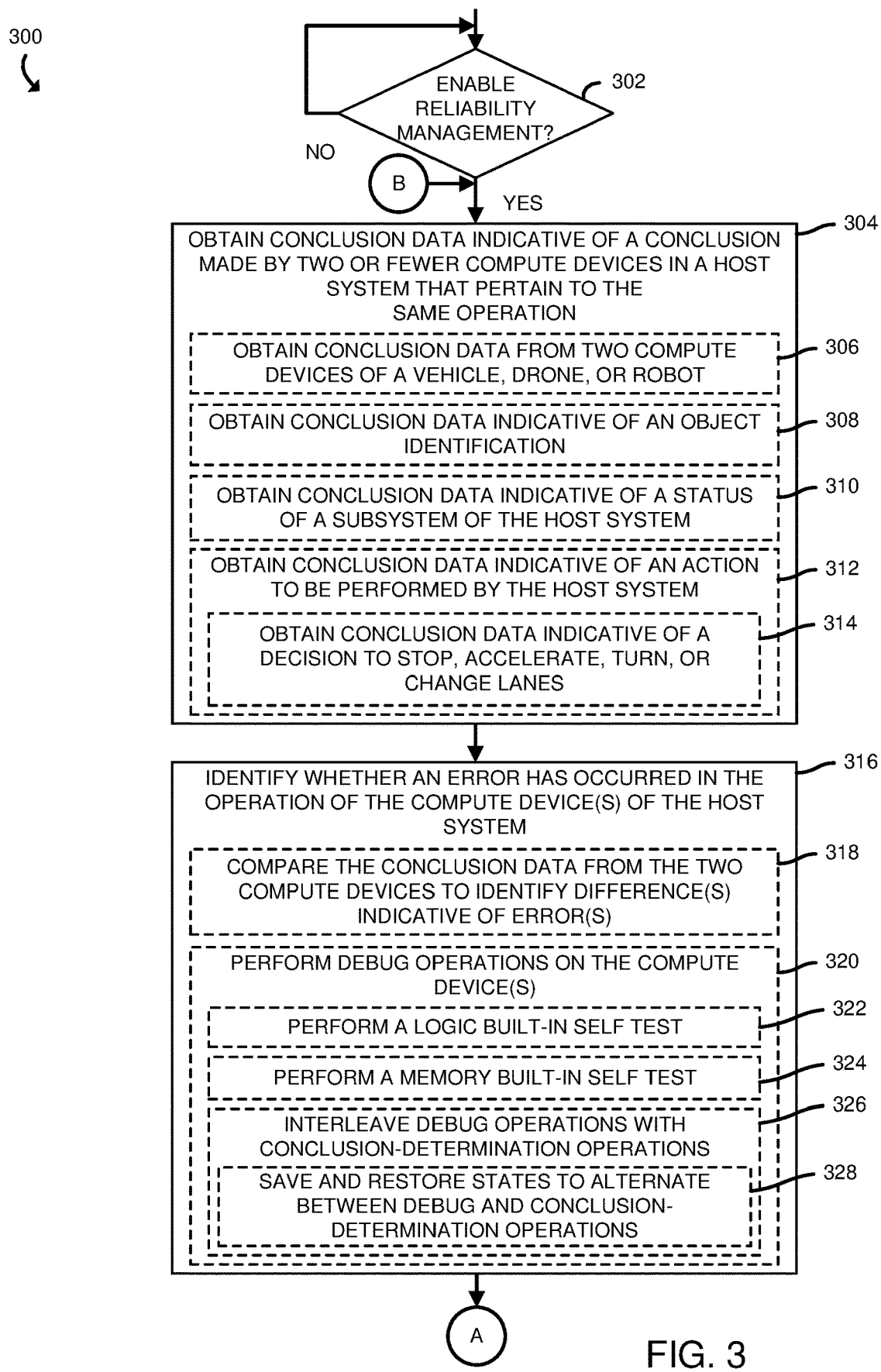
FIGS. 3-5 are a simplified block diagram of at least one embodiment of a method for efficiently providing reliable compute operations that may be performed by the system of FIG. 1.

Referring now to FIG. 3, the reliability management system 120, in operation, may execute a method 300 for efficiently providing reliable compute operations. The method 300 begins with block 302, in which the reliability management system 120 (e.g., the compute device 130 and/or the error management logic unit 140) determines whether to enable reliability management. In making the determination, the reliability management system 120 may determine whether a configuration setting (e.g., stored in a configuration file in the data storage device 222) indicates that reliability management should be enabled, whether the error management logic unit 140 is operable and in communication with at least one of the compute device(s) 130, 132, 150, and/or based on other factors. Regardless, in response to a determination to enable reliability management, the method 300 advances to block 304, in which the reliability management system 120 obtains conclusion data indicative of a conclusion (e.g., a determination) made by two or fewer compute devices in a host system (e.g., the host system 110). In the illustrative embodiment, the conclusions made by the compute device(s) (e.g., the compute devices 130, 132) pertain to the same operation (e.g., both compute devices 130, 132 performed the same calculation, and, as such, should have made the same determination). For example, and as indicated in block 306, the reliability management system 120 (e.g., the error management logic unit 140 of the reliability management system 120) may obtain conclusion data from two compute devices (e.g., the compute devices 130, 132) of a vehicle, a drone, or a robot (e.g., the host system 110 is a vehicle, a drone, or a robot). As indicated in block 308, the reliability management system 120 may obtain conclusion data indicative of an object identification (e.g., an identification of another vehicle on a roadway, an identification of a stop sign, etc.). As another example, the conclusion data may be indicative of a status of a subsystem of the host system 110 (e.g., a condition of a set of brakes, an engine temperature, etc.), as indicated in block 310. As indicated in block 312, in obtaining the conclusion data, the reliability management system 120 may obtain conclusion data indicative of an action to be performed by the host system 110. For example, the conclusion data may indicate a decision to stop, accelerate, turn, or change lanes, as indicated in block 314. In other embodiments, the conclusion data may pertain to other determinations made by one or more compute devices (e.g., one or more of the compute devices 130, 132).

Subsequently, the method 300 advances to block 316 in which the reliability management system 120 identifies whether an error has occurred in the operation of the compute device(s) 130, 132. In doing so, the reliability management system 120 may compare the conclusion data from two compute devices 130, 132 to identify differences, which may indicate errors, as indicated in block 318. Additionally or alternatively, the reliability management system 120 may perform debug operations on one or more of the compute devices 130, 132, as indicated in block 320. For example, and as indicated in block 322, a compute device (e.g., the compute device 130) may perform a logic built-in self test. In a logic built-in self test (logic BIST), dedicated hardware, such as the debug logic unit 180, sends out test patterns generated by a pseudorandom pattern generator (PRPG) to circuitry (e.g., gates in the processor 212) and then collects responses in a multiple-input signature register (MISR). The final content of the MISR is a signature that determines a pass/fail result. More specifically, the signature is then compared to a pre-calculated, or expected, signature to determine whether there is a match. If there is no match, then an error is present in the logic (e.g., in the processor 212).

Figure 10:
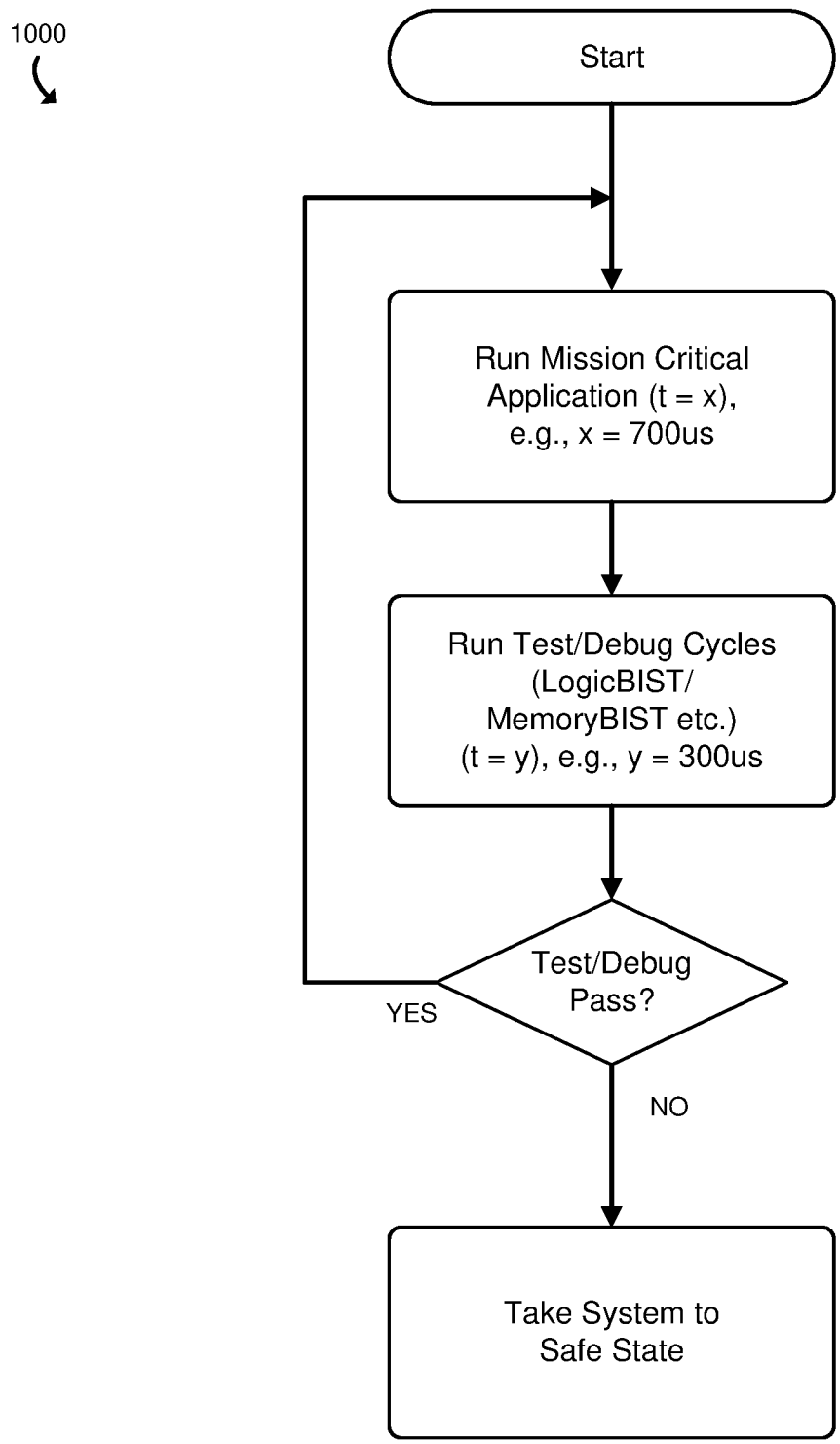
FIG. 10 is a simplified block diagram of at least one embodiment of a method that may be executed by the system of FIG. 1 to continually perform mission-related operations and self-test operations.

As indicated in block 324, the reliability management system 120 may perform a memory built-in self test (memory BIST). In doing so, the debug logic unit 180 may write predefined data patterns to sections of the memory 214, read back data from those sections of the memory, and determine whether the read data matches the predefined data patterns that were written to those memory sections. If the read data does not match the predefined data patterns, then an error is present in the memory 214. In some embodiments, a compute device (e.g., the compute device 130) may interleave the debug operations (e.g., the self tests) with the conclusion determination operations (e.g., operations that produce conclusion data, such as identification of objects, determinations of the status of various subsystems of the host system 110, determinations of responsive actions to perform, etc.), as indicated in block 326. A simplified flow diagram of a method 1000 for interleaving the debug operations with the conclusion determination operations is shown in FIG. 10. In interleaving the debug operations with the conclusion determination operations, the reliability management system 120 (e.g., the compute device 130) may save and restore memory states to alternate between the debug and conclusion determination operations, as indicated in block 328 and as shown in the method 1100 illustrated in FIG. 11. Afterwards, the method 300 advances to block 330 of FIG. 4, in which the reliability management system 120 determines the subsequent course of action as a function of whether one or more errors were detected. If no errors were detected, the method 300, in the illustrative embodiment, loops back to block 304 of FIG. 3, in which the reliability management system 120 obtains addition conclusion data (e.g., an identification of another object on the roadway, etc.). Otherwise, if one or more errors were detected, the method 300 advances to block 332, in which the reliability management system 120 determines the severity of the error(s).

Figure 4:
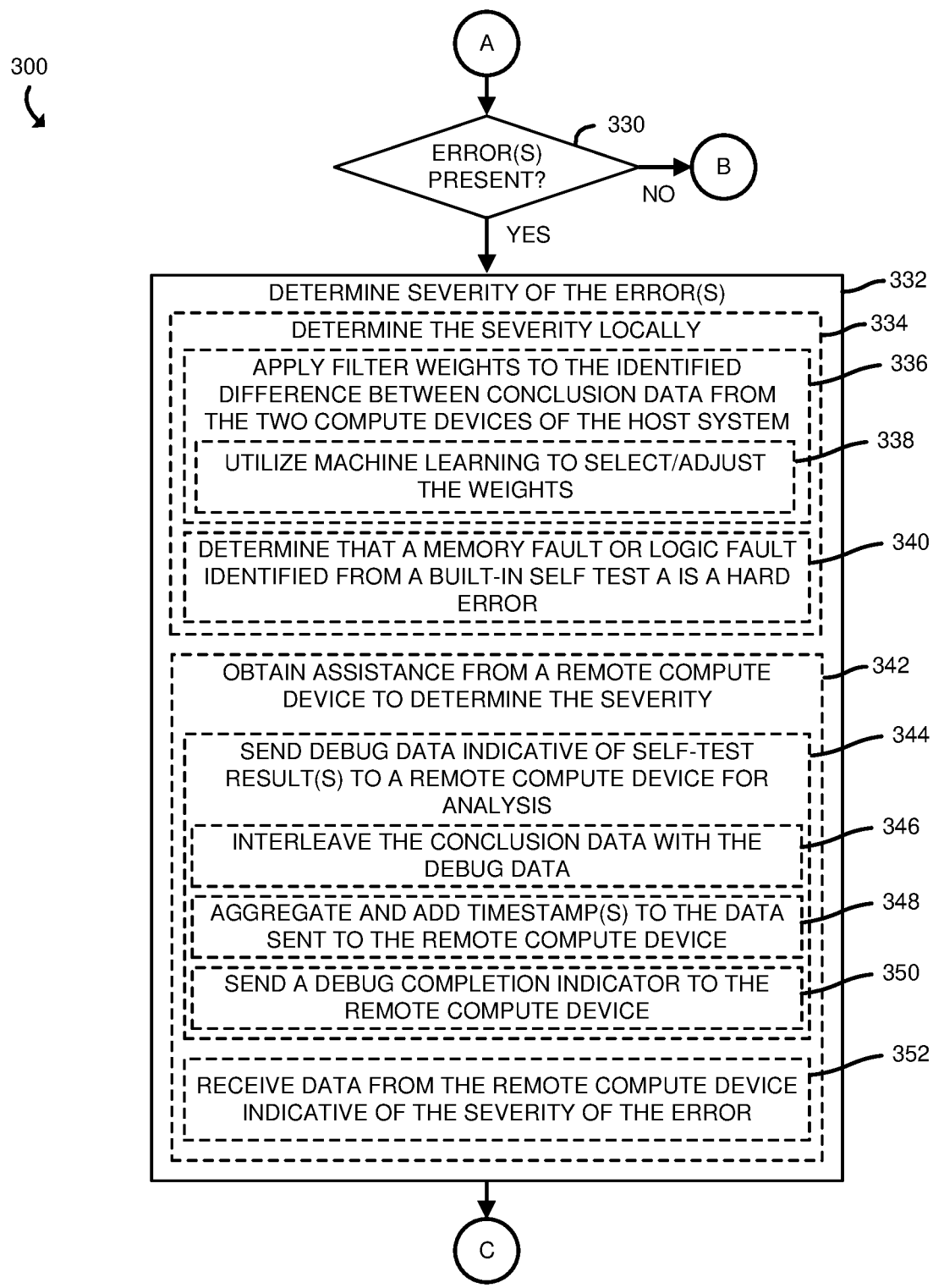

Referring now to FIG. 4, in determining the severity of the error(s), the reliability management system 120 may determine the severity locally, as indicated in block 334. In doing so, the reliability management system (e.g., the error management logic unit 140) may apply filter weights to the identified difference between the conclusion data from the two compute devices 130, 132, as indicated in block 336. As such, a difference in a determination of one type (e.g., an object classification) made by both compute devices 130, 132 may have one weight (e.g., severity), while a difference in a determination of another type (e.g., a status of a subsystem of the host system 110 or a determination of a responsive action to be taken) may have a different weight (e.g., severity) assigned to it. Moreover, the conclusion data may indicate multiple differences in the conclusions made by the two compute devices and the filter weights may be applied differently based on the number of differences present (e.g., a low weight if one to two differences are present, a medium weight if three to five differences are present, and a high weight if six or more differences are present).

As indicated in block 338, the reliability management system 120 (e.g., the error management logic unit 140) may utilize a machine learning process (e.g., updating weights in a neural network in response to feedback, such as from a human administrator or from other compute devices, such as the compute device 150, as to the correct severity that should have been assigned to a given set of error(s)) to adjust the weights. As indicated in block 340, in the illustrative embodiment, the reliability management system 120 (e.g., the error management logic unit 140) determines that a memory fault or a logic fault identified from a built-in self test (e.g., from block 320) is a hard fault (e.g., as distinguished from a glitch, which may be ignored, or a soft-fault which may be recovered from with a software update or other configuration change). In other embodiments, a memory fault or logic fault may be determined to be a glitch which can be safely ignored or a soft fault which can be recovered from.

Figure 8:
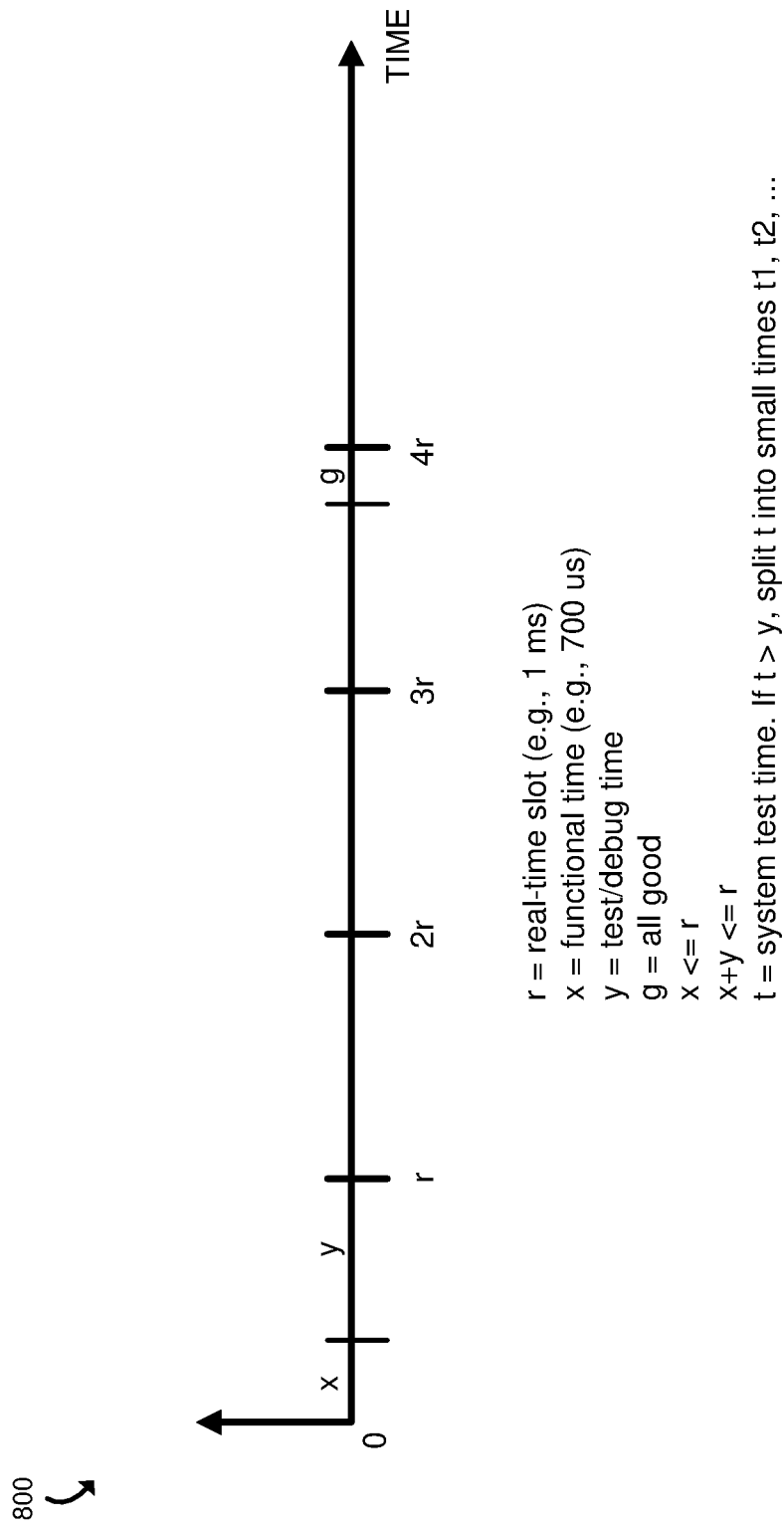
FIG. 8 is a simplified block diagram of another embodiment of the system of FIG. 1, in which a single compute device provides output to a master control unit and a remote compute device performs machine learning operations on data received from the master control unit.

Still referring to FIG. 4, in determining the severity of the error(s), the reliability management system 120 may additionally or alternatively obtain assistance from a remote compute device (e.g., the compute device 150), as indicated in block 342. In doing so, the reliability management system 120 may send debug data indicative of the self-test results to the remote compute device (e.g., the compute device 150) for analysis, as indicated in block 344. The compute device 150 may then perform an analysis similar to that described with reference to block 340. As indicated in block 346, the reliability management system 120 may interleave the conclusion data with the debug data (e.g., allocating 700 microseconds to sending conclusion data and 300 microseconds to sending debug data, in a given time slot of 1 millisecond). An example timeline 800 for sending the conclusion data and debug data is shown in FIG. 8. As indicated in block 348, the reliability management system 120 may aggregate (e.g., collect) and add timestamps to the data (e.g., conclusion data and debug data) that is to be sent to the remote compute device 150 for analysis. Further, and as indicated in block 350, the reliability management system 120 may send a debug completion indicator to the remote compute device 150 to indicate when a set of self-test operations have been completed (e.g., thereby indicating to the remote compute device 150 that the debug data, which may have been sent over a series of time slots, is ready to be analyzed). In block 352, the reliability management system 120 may receive, from the remote compute device 150, data indicative of the severity of any error(s) in the operation of the reliability management system 120 (e.g., in the operation of the compute device 130). Subsequently, the method 300 advances to block 354 of FIG. 5, in which the reliability management system 120 performs a responsive action as a function of the determined severity of the error(s).

Figure 5:
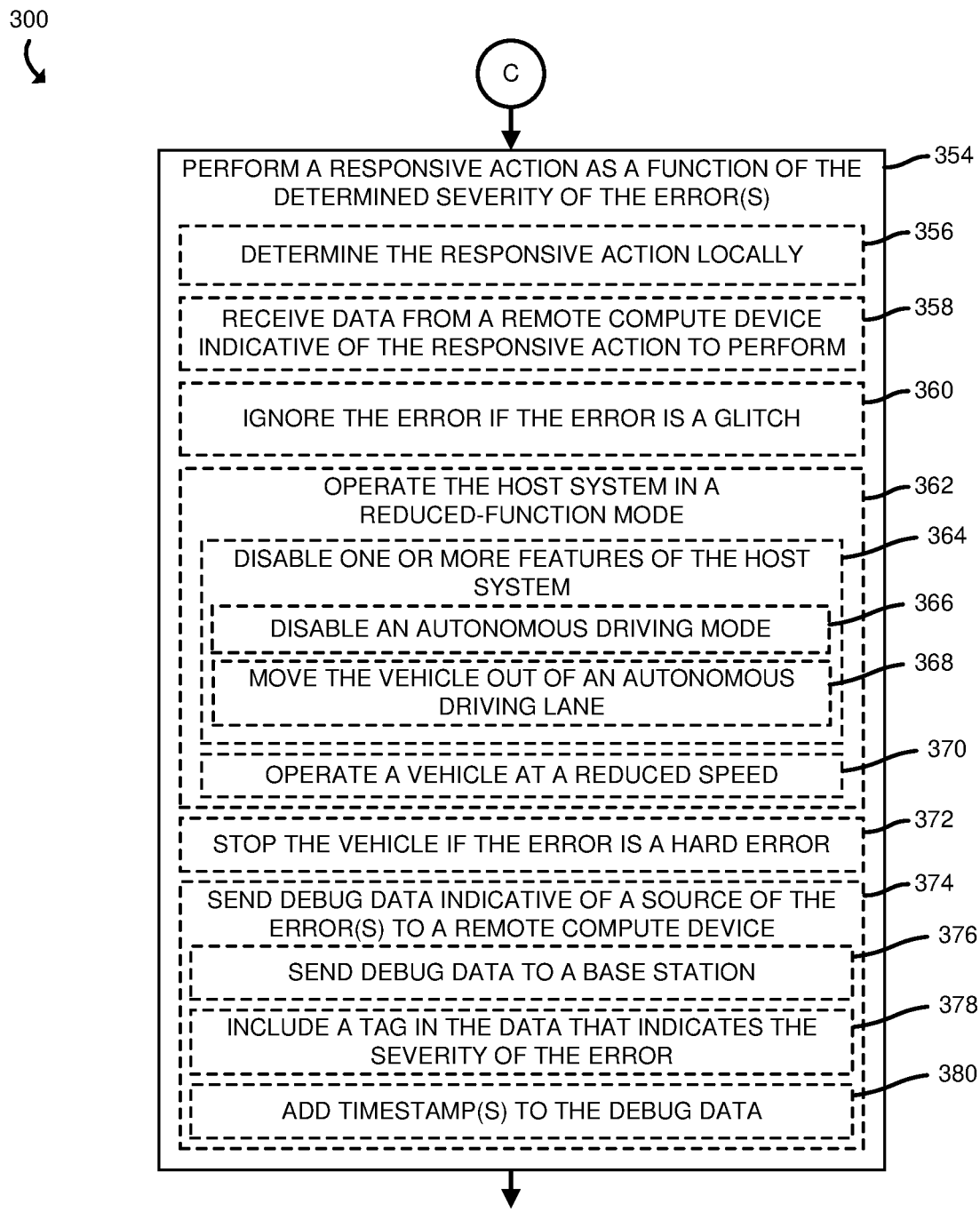

Referring now to FIG. 5, in performing the responsive action, the reliability management system 120 may determine the responsive action locally (e.g., with the error management logic unit 140), as indicated in block 356. For example, the reliability management system 120 may compare the error severity to a data set (e.g., in the memory 214 or in a data storage device 222) that associates error severity levels with corresponding responsive action(s) to be taken. Alternatively, the reliability management system 120 may receive data from a remote compute device (e.g., the remote compute device 150) indicative of the responsive action to perform, as indicated in block 358. That is, the remote compute device 150 may perform a similar analysis as that described with reference to block 356 and send the resulting determination of the responsive action to the reliability management system 120 through the network 112. As indicated in block 360, the reliability management system 120 may ignore an error if the error is determined to be a glitch (e.g., the error is unlikely to occur again in the future).

As indicated in block 362, the reliability management system 120 may cause the host system 110 to operate in a reduced-function mode, such as if the error is a soft error (e.g., the error can be recovered from with a software update). For example, and as indicated in block 364, the reliability management system 120 may disable one or more features of the host system 110. In doing so, the reliability management system 120 may disable an autonomous driving mode of the host system 110 (e.g., if the host system is a vehicle), as indicated in block 366 and may move the vehicle out of an autonomous driving lane, as indicated in block 368. Additionally or alternatively, the reliability management system 120 may operate the vehicle at a reduced speed (e.g., reduce the maximum speed of the vehicle), as indicated in block 370. Alternatively, if the error is determined to be a hard error, the reliability management system 120 may stop the vehicle (e.g., pull over the vehicle to the side of a road, land a drone, etc.), as indicated in block 372. Further, and as indicated in block 374, the reliability management system 120 may send debug data indicative of the source of the error(s) to a remote compute device (e.g., the compute device 150) for analysis. In doing so, the reliability management system 120 may send the debug data to a base station (e.g., a relay located at the center of any of the cells of a cellular telephone system), as indicated in block 376. Further, in the illustrative embodiment, the reliability management system 120 may add, to the debug data, a tag which may be embodied as any data indicative of the severity of the error, as indicated in block 378. The tag data may further indicate an organization (e.g., a government, the manufacturer of the host system 110, a fleet management organization, etc.) to which the debug data should be sent (e.g., by the remote compute device 150). Further, and as indicated in block 380, the reliability management system 120 may add timestamps to the debug data, indicative of the times at which the error and operations leading up to the error occurred.

Figure 6:
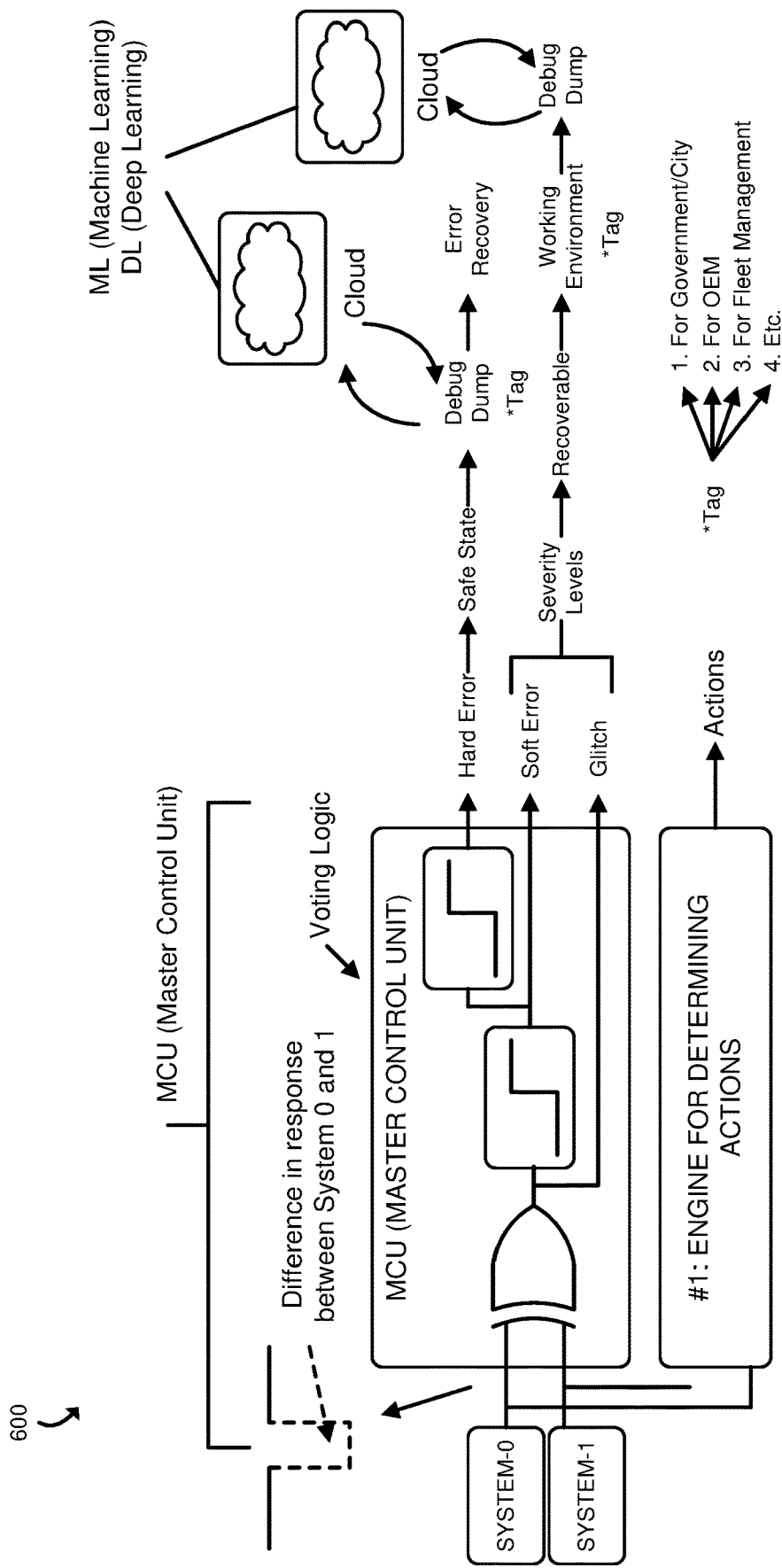
FIG. 6 is a simplified diagram of at least one embodiment of the system of FIG. 1, in which two compute devices provide output to a master control unit.

Referring now to FIG. 6, an embodiment 600 of the system 100 is shown in which two compute devices (e.g., system 0 and system 1), similar to the compute devices 130, 132, provide output (e.g., conclusion data) to a master control unit (MCU), which is similar to the the error management logic unit 140 of FIG. 1. The MCU performs a scheme similar to an exclusive-OR function to differentiate the outputs between the two CPUs (e.g., system 0 and system 1) to find the error between the two. The error is then sent through filter weights to determine the differences and to classify them as a hard error, soft error, or an intermittent glitch. Further, the system 600 may send debug data to a cloud compute device (e.g., the remote compute device 150) for analysis using machine learning, as described with reference to the method 300. In some embodiments, the debug data may include a tag, as described with reference to block 378 of FIG. 5. The system 600 may take different responsive actions depending on the determined severity of the error(s), as described with reference to block 354 of FIG. 5.

Figure 7:
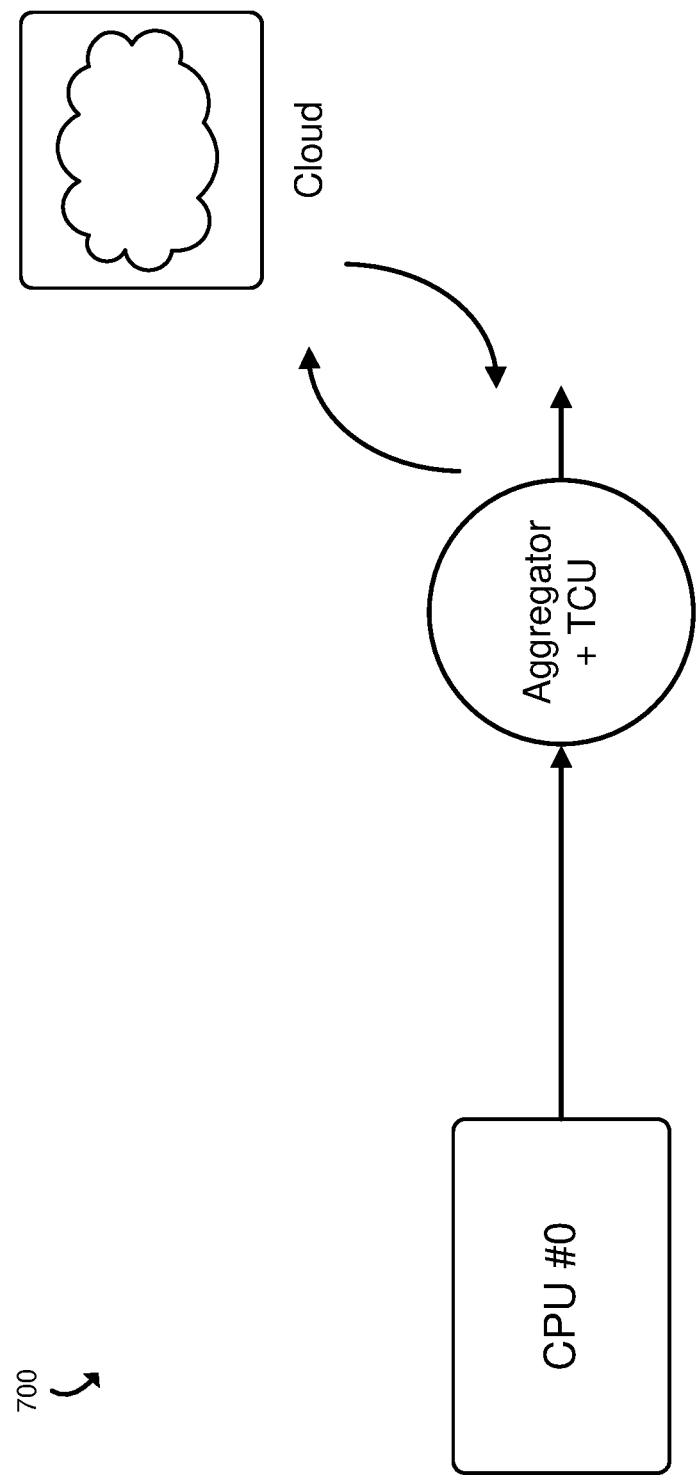
FIG. 7 is a simplified block diagram of at least one embodiment of the system of FIG. 1, in which a single compute device provides output to an aggregator and off-loads machine learning operations to a remote compute device.

Referring now to FIG. 7, an embodiment 700 of the system 100 includes a single compute device (e.g., CPU #0), similar to the compute device 130, rather than two compute devices. The compute device sends output data (e.g., debug information and conclusion data) to an aggregator that includes a time control unit. The aggregator may be embodied as any device or circuitry (e.g., a processor, an integrated circuit, etc.) configured to collect the data received from the compute device (e.g., CPU #0) and the time control unit (TCU) may be embodied as any device or circuitry (e.g., a processor, an integrated circuit, etc.) configured to add time stamps to the received data. Additionally, the aggregator sends the data to a cloud compute device (e.g., the remote compute device 150) for analysis to determine the responsive action to be performed.

Referring now to FIG. 8, in real-time systems, the time distribution of the real time slots are shown in a timeline 800. In the timeline 800, functional or mission mode information (e.g., conclusion data) is shown as being sent during "x", and test/debug data is sent during "y". Further, in the illustrative embodiment, the logic self-test and the memory self-test are performed in an interleaved manner, rather than concurrently. A small time slot, g, is used to send an indicator that the self tests have been completed.

Figure 9:
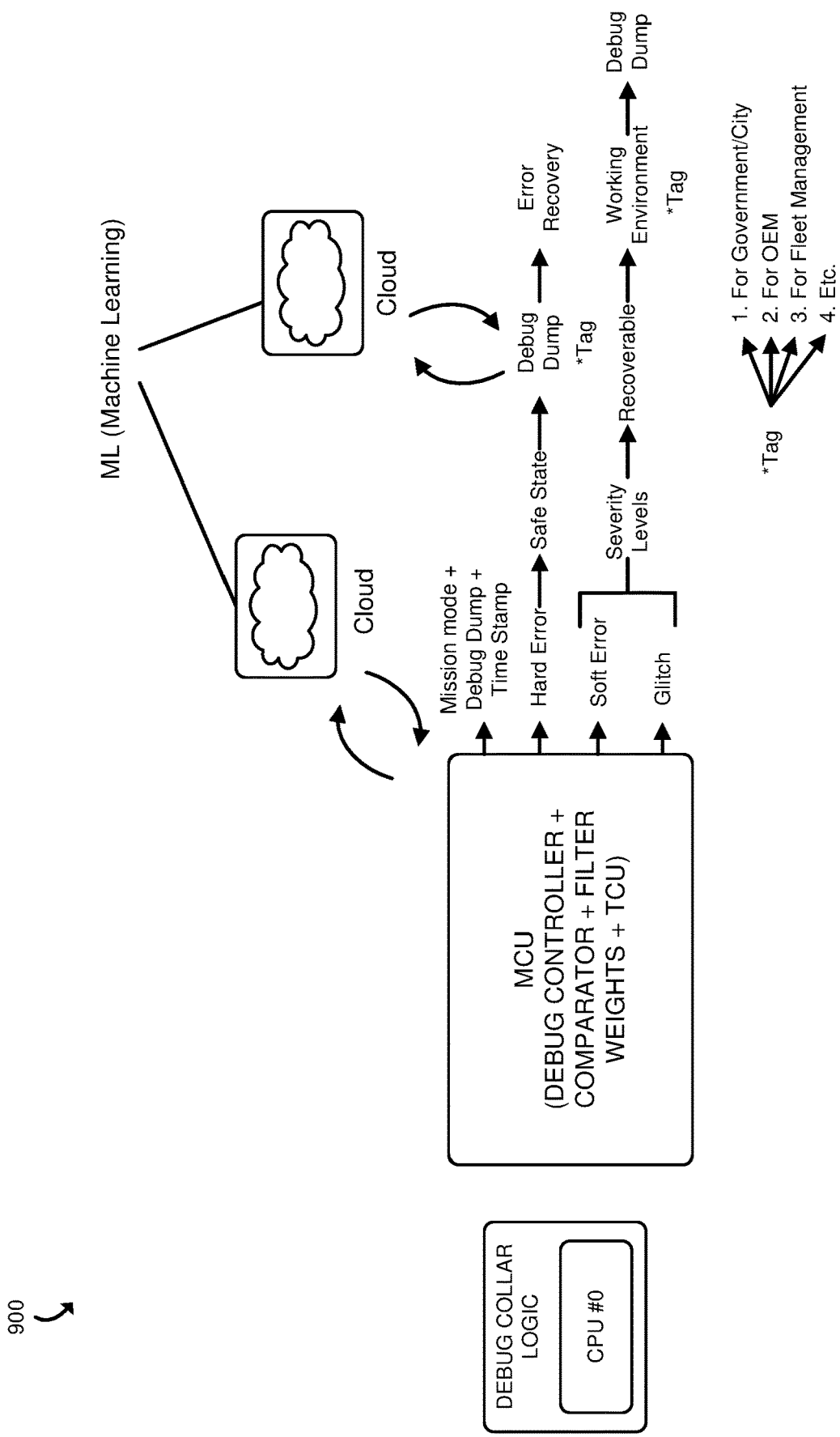
FIG. 9 is a diagram of a timeline over which the system of FIG. 1 may send functional and debug data to a remote compute device.
Figure 11:
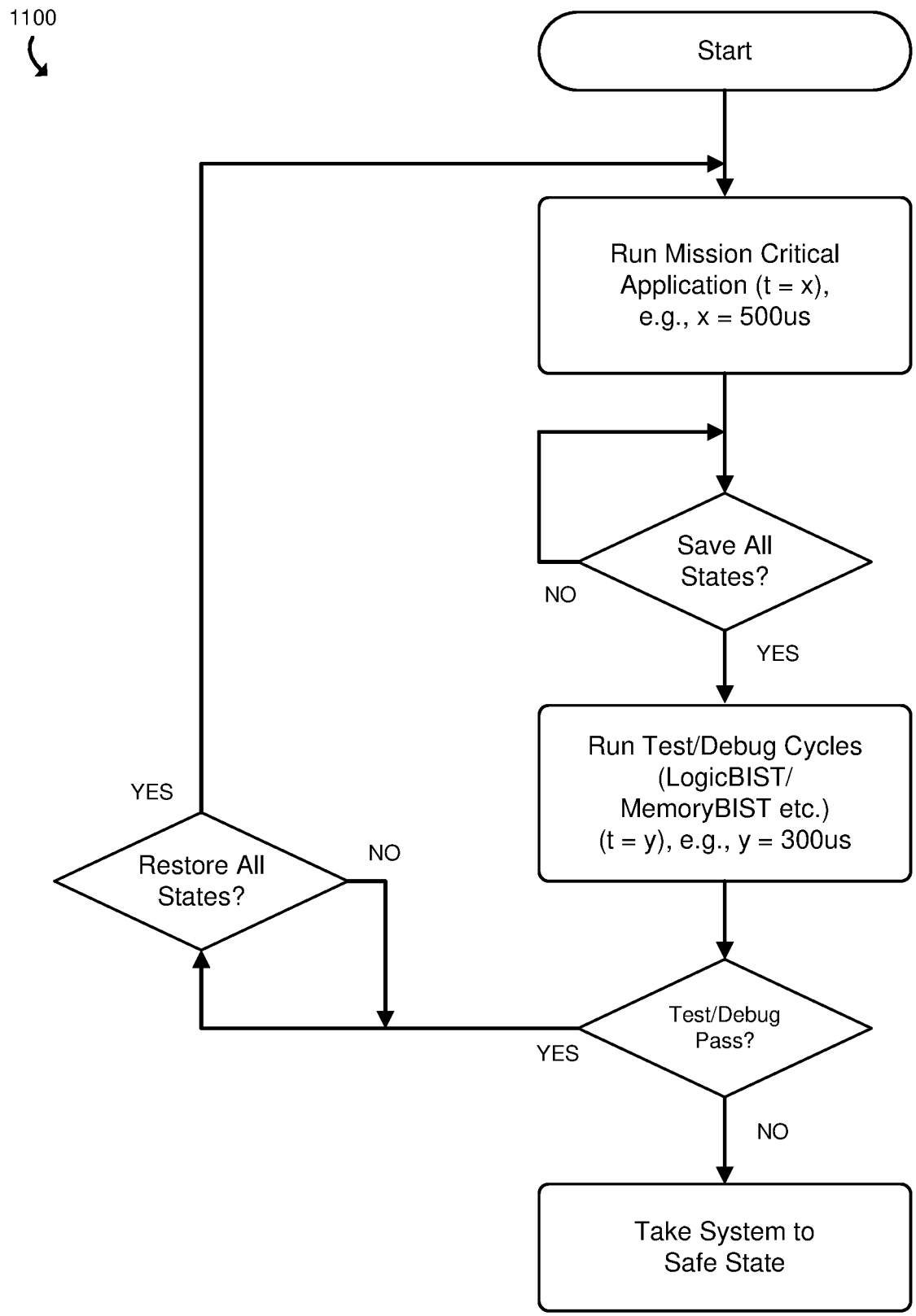
FIG. 11 is a simplified block diagram of at least one embodiment of a method that may be executed by the system of FIG. 1 to save and restore state information between mission-related operations and self-test operations.

Referring now to FIG. 9, another embodiment 900 of the system 100 is shown. In the embodiment 900, the MCU implements a debug controller along with a comparator, filter weights to differentiate the error signals to output error severities (e.g., hard error, soft error, or glitch) along with the TCU (Time Control Unit) to add time-stamps to the debug data. The debug data is sent from the MCU to the cloud (e.g., the remote compute device 150) for analysis (e.g., with machine learning) to determine the responsive action that should be performed. Alternatively, the machine learning operation may be performed locally (e.g., in the MCU). As discussed with reference to the method 300, FIG. 10 illustrates an example method 1000 for interleaving debug operations (e.g., self-test operations) with the conclusion determination operations and FIG. 11 illustrates example method 1100 for saving and restoring memory states to alternate between the debug and conclusion determination operations.

Examples

Illustrative examples of the technologies disclosed herein are provided below. An embodiment of the technologies may include any one or more, and any combination of, the examples described below.

Example 1 includes a reliability management system comprising circuitry to obtain conclusion data indicative of a conclusion made by each of two or fewer compute devices of a host system, wherein the conclusion data from each compute device pertains to the same operation; identify whether an error has occurred in the operation of each compute device; determine, in response to a determination that an error has occurred, a severity of the error; and cause the host system to perform a responsive action as a function of the determined severity of the error.

Example 2 includes the subject matter of Example 1, and wherein the host system is a vehicle and wherein to obtain the conclusion data comprises to obtain conclusion data indicative of an identification of an object.

Example 3 includes the subject matter of any of Examples 1 and 2, and wherein the two or fewer compute devices comprises a single compute device.

Example 4 includes the subject matter of any of Examples 1-3, and wherein to identify whether an error has occurred comprises to compare the conclusion data from the two compute devices to identify a difference between the conclusions, wherein the difference is indicative of an error.

Example 5 includes the subject matter of any of Examples 1-4, and wherein to determine the severity of the error comprises to apply one or more filter weights to the identified difference.

Example 6 includes the subject matter of any of Examples 1-5, and wherein the circuitry is further to utilize machine learning to select or adjust the filter weights applied to the identified difference.

Example 7 includes the subject matter of any of Examples 1-6, and wherein the two or fewer compute devices comprises a single compute device and wherein to identify whether an error has occurred comprises to perform a self test of logic or memory of the compute device.

Example 8 includes the subject matter of any of Examples 1-7, and wherein to perform the self test comprises to interleave the self test with conclusion determination operations on the compute device.

Example 9 includes the subject matter of any of Examples 1-8, and wherein to interleave the self test with the conclusion determination operations comprises to save and restore states to alternate between the self test and conclusion determination operations.

Example 10 includes the subject matter of any of Examples 1-9, and wherein to determine the severity of the error comprises to determine that a memory fault or a logic fault identified from the self test is a hard error.

Example 11 includes the subject matter of any of Examples 1-10, and wherein to determine the severity of the error comprises to send data indicative of a result of the self test to a remote compute device for analysis and receive responsive data from the remote compute device indicative of the severity of the error.

Example 12 includes the subject matter of any of Examples 1-11, and wherein to cause the host device to perform a responsive action as a function of the severity of the error comprises to disable, in response to a determination that the error is a soft error that can be recovered from, one or more features of the host device.

Example 13 includes the subject matter of any of Examples 1-12, and wherein to cause the host device to perform a responsive action as a function of the severity of the error comprises to stop movement of the host system and send, to a remote compute device, debug data indicative of a source of the error to a remote compute device for analysis.

Example 14 includes the subject matter of any of Examples 1-13, and wherein to send the debug data comprises to send a tag indicative of the severity of the error and a timestamp indicative of a time when the error occurred.

Example 15 includes one or more machine-readable storage media comprising a plurality of instructions stored thereon that, in response to being executed, cause a reliability management system to obtain conclusion data indicative of a conclusion made by each of two or fewer compute devices of a host system, wherein the conclusion data from each compute device pertains to the same operation; identify whether an error has occurred in the operation of each compute device; determine, in response to a determination that an error has occurred, a severity of the error; and cause the host system to perform a responsive action as a function of the determined severity of the error.

Example 16 includes the subject matter of Example 15, and wherein the host system is a vehicle and wherein to obtain the conclusion data comprises to obtain conclusion data indicative of an identification of an object.

Example 17 includes the subject matter of any of Examples 15 and 16, and wherein the two or fewer compute devices comprises a single compute device.

Example 18 includes the subject matter of any of Examples 15-17, and wherein to identify whether an error has occurred comprises to compare the conclusion data from the two compute devices to identify a difference between the conclusions, wherein the difference is indicative of an error.

Example 19 includes the subject matter of any of Examples 15-18, and wherein to determine the severity of the error comprises to apply one or more filter weights to the identified difference.

Example 20 includes a method comprising obtaining, by a reliability management system, conclusion data indicative of a conclusion made by each of two or fewer compute devices of a host system, wherein the conclusion data from each compute device pertains to the same operation; identifying, by the reliability management system, whether an error has occurred in the operation of each compute device; determining, by the reliability management system and in response to a determination that an error has occurred, a severity of the error; and causing, by the reliability management system, the host system to perform a responsive action as a function of the determined severity of the error.

The invention claimed is:

1. A reliability management system comprising:
  circuitry to:
    obtain conclusion data indicative of a conclusion made by each of two or fewer compute devices of a host system, wherein the conclusion data from each compute device pertains to the same operation;
    identify whether an error has occurred in the operation of each compute device, wherein to identify whether an error has occurred comprises to perform a self test of logic or memory of the compute device, and wherein to perform the self test comprises to interleave the self test with conclusion determination operations on the compute device, and wherein the circuitry is to interleave the self test with the conclusion determination operations by saving and restoring states and alternating between the self test and conclusion determination operations;
    determine, in response to a determination that an error has occurred, a severity of the error at least partially based on results of the self test; and
    cause the host system to perform a responsive action as a function of the determined severity of the error.

2. The reliability management system of claim 1, wherein the host system is a vehicle and wherein to obtain the conclusion data comprises to obtain conclusion data indicative of an identification of an object.

3. The reliability management system of claim 1, wherein the two or fewer compute devices comprises a single compute device.

4. The reliability management system of claim 1, wherein to identify whether an error has occurred comprises to compare the conclusion data from the two compute devices to identify a difference between the conclusions, wherein the difference is indicative of an error.

5. The reliability management system of claim 4, wherein to determine the severity of the error comprises to apply one or more filter weights to the identified difference.

6. The reliability management system of claim 5, wherein the circuitry is further to utilize machine learning to select or adjust the filter weights applied to the identified difference.

7. The reliability management system of claim 1, wherein to determine the severity of the error comprises to determine that a memory fault or a logic fault identified from the self test is a hard error.

8. The reliability management system of claim 1, wherein to determine the severity of the error comprises to send data indicative of a result of the self test to a remote compute device for analysis and receive responsive data from the remote compute device indicative of the severity of the error.

9. The reliability management system of claim 1, wherein to cause the host device to perform a responsive action as a function of the severity of the error comprises to disable, in response to a determination that the error is a soft error that can be recovered from, one or more features of the host device.

10. The reliability management system of claim 9, wherein to cause the host device to perform a responsive action as a function of the severity of the error comprises to stop movement of the host system and send, to a remote compute device, debug data indicative of a source of the error to a remote compute device for analysis.

11. The reliability management system of claim 10, wherein to send the debug data comprises to send a tag indicative of the severity of the error and a timestamp indicative of a time when the error occurred.

12. One or more non-transitory machine-readable storage media comprising a plurality of instructions stored thereon that, in response to being executed, cause a reliability management system to:
  obtain conclusion data indicative of a conclusion made by each of two or fewer compute devices of a host system, wherein the conclusion data from each compute device pertains to the same operation;
  identify whether an error has occurred in the operation of each compute device, wherein to identify whether an error has occurred comprises to perform a self test of logic or memory of the compute device, and wherein to perform the self test comprises to interleave the self test with conclusion determination operations on the compute device, and wherein the instructions are to interleave the self test with the conclusion determination operations by saving and restoring states and alternating between the self test and conclusion determination operations;
  determine, in response to a determination that an error has occurred, a severity of the error at least partially based on results of the self test; and
  cause the host system to perform a responsive action as a function of the determined severity of the error.

13. The one or more non-transitory machine-readable storage media of claim 12, wherein the host system is a vehicle and wherein to obtain the conclusion data comprises to obtain conclusion data indicative of an identification of an object.

14. The one or more non-transitory machine-readable storage media of claim 12, wherein the two or fewer compute devices comprises a single compute device.

15. The one or more non-transitory machine-readable storage media of claim 12, wherein to identify whether an error has occurred comprises to compare the conclusion data from the two compute devices to identify a difference between the conclusions, wherein the difference is indicative of an error.

16. The one or more non-transitory machine-readable storage media of claim 15, wherein to determine the severity of the error comprises to apply one or more filter weights to the identified difference.

17. A method comprising:
obtaining, by a reliability management system, conclusion data indicative of a conclusion made by each of two or fewer compute devices of a host system, wherein the conclusion data from each compute device pertains to the same operation;
identifying, by the reliability management system, whether an error has occurred in the operation of each compute device, wherein identifying whether an error has occurred comprises performing a self test of logic or memory of the compute device, and wherein performing the self test comprises interleaving the self test with conclusion determination operations on the compute device, and wherein interleaving the self test with the conclusion determination operations comprises to saving and restoring states and alternating between the self test and conclusion determination operations;
determining, by the reliability management system and in response to a determination that an error has occurred, a severity of the error at least partially based on results of the self test; and
causing, by the reliability management system, the host system to perform a responsive action as a function of the determined severity of the error.

* * * * *